United States Patent [19]
Park

[11] Patent Number: 5,539,563
[45] Date of Patent: Jul. 23, 1996

[54] SYSTEM AND METHOD FOR SIMULTANEOUSLY COMPENSATING FOR CHROMATIC DISPERSION AND SELF PHASE MODULATION IN OPTICAL FIBERS

[75] Inventor: Yong-Kwan Park, Wescosville, Pa.

[73] Assignee: AT&T Corp., Murray Hill, N.J.

[21] Appl. No.: 253,174

[22] Filed: May 31, 1994

[51] Int. Cl.$^6$ .................................................. H04B 10/00
[52] U.S. Cl. ........................... 359/161; 359/160; 359/173; 359/341
[58] Field of Search ..................................... 359/160–161, 359/173, 188, 134, 181–183, 195, 341; 385/122; 372/6

[56] References Cited

U.S. PATENT DOCUMENTS

| | | | |
|---|---|---|---|
| 5,218,662 | 6/1993 | Dugan | 359/161 |
| 5,355,240 | 10/1994 | Prigent et al. | 359/161 |
| 5,361,319 | 11/1994 | Antos et al. | 385/123 |

FOREIGN PATENT DOCUMENTS

| | | |
|---|---|---|
| 0598554A1 | 11/1992 | European Pat. Off. . |
| 0554714A1 | 1/1993 | European Pat. Off. . |
| 0575881A1 | 6/1993 | European Pat. Off. . |
| 53-13025 | 11/1993 | Japan ......................... 359/161 |
| 2268018 | 12/1993 | United Kingdom . |

OTHER PUBLICATIONS

Simultaneous Compensation of Laser Chirp, Kerr Effect, and Dispersion in 10–Gb/s Long–Haul Transmission Systems, Nobuo Suzuki and Takeshi Ozeki, Journal of Lightware Technology, Jul. 1993, vol. 11, No. 7.

Marcuse, Dietrich et al., "Low Dispersion Single–Mode Fiber Transmission—The Question of Practical versus Theoretical Maximum Transmission Bandwidth", *IEEE Journal of Quantum Electronics*, vol. QE–17, No. 6, Jun. 1981, pp. 869–878.

Suzuki, Nobuo et al., "Simultaneous Compensation of Laser Chirp, Kerr Effect, and Dispersion in 10–Gb/s Long–Haul Transmission Systems", *Journal of Lightwave Technology*, vol. 11, No. 9, Sep. 1993, pp. 1486–1494.

Stern, Miklos et al., "Self–Phase Modulation and Dispersion in High Data Rate Fiber–Optic Transmission Systems", *Journal of Lightwave Technology*, vol. 8, No. 7, Jul. 1990, pp. 1009–1016.

Cheng, "Optimal Design for Direct–Detection System with Optical Amplifiers and Dispersion Compensators".

Journal of Lightwave Technology, vol. 11, No. 9, Sep. 1993, pp. 1495–1499.

*Primary Examiner*—Leo Boudreau
*Assistant Examiner*—Kinfe-Michael Negash

[57] ABSTRACT

At least one dispersion compensating fiber (DCF) is utilized to compensate for chromatic dispersion of an externally modulated signal carried by at least one single mode, standard fiber optic cable. The self phase modulation (SPM) effect in the standard fiber is characterized by a pulse compression and associated pulse distortion when a 1550 nm wavelength signal is launched into the fiber. Because the SPM effect in the DCF fiber is characterized by a pulse broadening for the same signal, the DCF fiber is also utilized to compensate for the SPM effect in the standard fiber. To this end, the signal power launched into the DCF fiber is controlled such that precise compensation for the SPM effect in the standard fiber can be achieved. Control of the launching power is needed because the mode field diameter of the DCF fiber is smaller than that of the standard single mode fiber so that the DCF fiber experiences the SPM effect at a lower power than the single mode fiber.

19 Claims, 5 Drawing Sheets

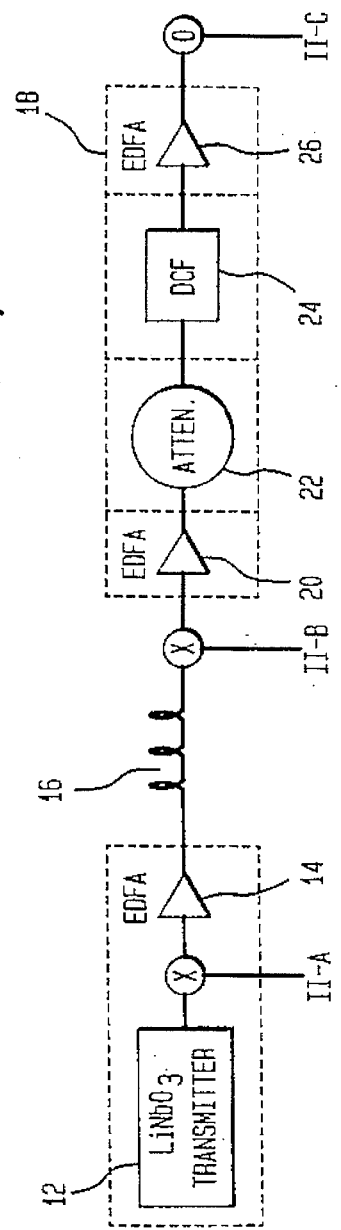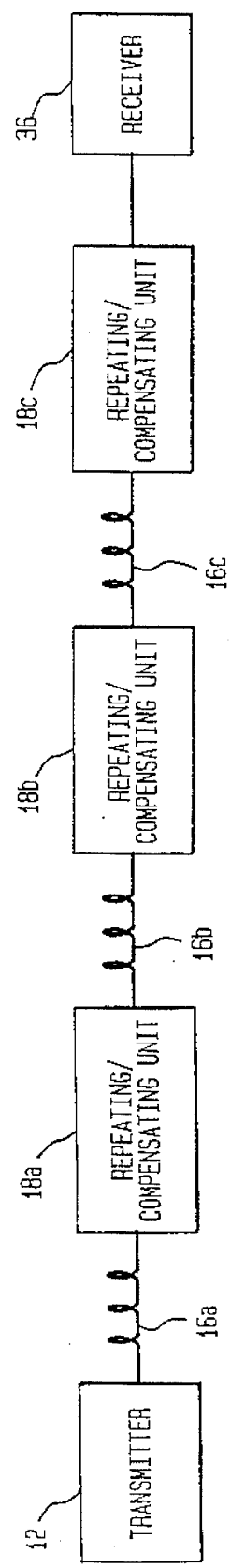

SYSTEM AND METHOD FOR SIMULTANEOUSLY COMPENSATING FOR CHROMATIC DISPERSION AND SELF PHASE MODULATION IN OPTICAL FIBERS

BACKGROUND OF THE INVENTION

1. Field of the Invention

The present invention relates to optical communications through the use of optical signals which are transmitted along optical fibers and, more particularly, to a system and method for minimizing the effects of chromatic dispersion and self-phase modulation (SPM) during the transmission of such signals. The invention is especially suitable for use in data communications over single-mode optical fibers by pulses which can represent, as by pulse code modulation (PCM), bytes of data.

2. Description of the Prior Art

Optical fiber systems have the potential for achieving extremely high communication rates. Existing single mode fiber systems have already demonstrated transmission rates in the multi-Gbits/second range. Although quite large, however, this represents only a small fraction of the available bandwidth. Full utilization of the low-loss window in the 1.3–1.5 micrometer region represents a potential available bandwidth on the order of 30 THz. Thus, future fiber-optic systems will likely be capable of operating at data rates approaching and even exceeding 50 Gb/s. At these extremely high data rates the modulation bandwidth is so large that even for an ideal source without chirp or phase noise, fiber dispersion broadens the optical pulse and thus limits transmission.

The majority of currently installed single mode fiber is dispersion optimized for 1310 nm wavelength and is typically referred to as "standard" SM fiber. Once fiber losses are compensated for by Erbium-doped optical amplifiers, the ultimate speed and power limitations on data transmission rates in the standard fiber result from chromatic dispersion and non-linear optical effects such as self-phase modulation (SPM). Applications of 1550 nm transmission systems on standard SM fibers have therefore attracted considerable attention to compensation schemes for chromatic dispersion and SPM.

It has, for example, been proposed to accomplish chromatic dispersion compensation in systems employing directly modulated lasers by measuring the dispersion characteristic of each section of standard SM fiber between amplification/compensation sites or nodes of the optical path and to then insert an appropriate amount of dispersion compensating fiber (DCF) at the end of each section. For one example of this technique, reference may be had to U.S. Pat. No. 5,218,662, entitled FIBER OPTIC CABLE SYSTEM AND METHOD FOR DISPERSION COMPENSATION AT NODES BETWEEN END POINTS, issued to Dugan on Jun. 8, 1993. The strong negative dispersion coefficient of the DCF fiber is utilized to offset the positive dispersion coefficient of the standard fiber. However, this concept does not consider or address the existence of non-linear effects in the fibers. In most applications, high optical power is launched into standard fiber to transmit the signal over long distances. This high power inevitably causes nonlinear effects in the fiber; the effects, particularly SPM, induce spectral broadening of the optical signal and therefore distort the optical pulse. This SPM effect must be compensated in order to achieve long distance transmission. Moreover, the method proposed by Dugan employs a directly modulatable laser transmitter, which inherently produces broad spectral signals. Therefore, this method requires relatively accurate compensation of the dispersion.

Nobuo Suzuki et al., in a paper entitled "Simultaneous Compensation of Laser Chirp, Kerr Effect, and Dispersion in 10 Gb/s Long Haul Transmission Systems", 11 Journal of Lightwave Technology, No. 9 (September 1990), discuss a dispersion compensation technique in which laser transient chirp and SPM are simultaneously compensated by equalizing fibers inserted within certain intervals before the EDFA's. Like the Dugan system, however, the Suzuki technique is limited to systems in which a directly modulated laser operating in the SLMQW structure is utilized. This technique is therefore inapplicable to externally modulated transmission systems in which a laser operated in CW mode is employed, and no transient chirp is available to compensate the SPM.

Consequently, it would be advantageous to provide a 1550 nm optical fiber communication system employing embedded standard single mode fibers in which chromatic dispersion and self phase modulation are compensated only by the optical repeaters newly installed. That is, the simultaneous compensation in such a system would be achieved without changing any parameters of the existing transmission systems.

SUMMARY OF THE INVENTION

The aforementioned object, as well as others which will become apparent to those of ordinary skill in the art, are achieved by a system in which at least one dispersion compensating fiber (DCF) is utilized to compensate for chromatic dispersion of an externally modulated signal carried by at least one single mode, standard fiber optic cable. The SPM effect in the standard fiber is characterized by a pulse compression and associated pulse distortion when a 1.55 wavelength signal is launched into the fiber. Because the SPM effect in the DCF fiber is characterized by a pulse broadening for the same signal, the DCF fiber can also be utilized to compensate for the SPM effect in the standard fiber. To this end, means are provided for controlling the power launched into the DCF such that precise compensation for the SPM effect in the standard fiber can be achieved. Such control of the launch power is needed because the mode field diameter of the DCF is smaller than that of the standard single mode fiber so that the DCF fiber experiences the SPM effect at a lower power than the single mode fiber.

Optical repeaters constructed in accordance with the present invention may be utilized at various intervals along an extended optical path to restore optical signal levels. Each optical repeater module includes a section of DCF, a first amplifier having an output coupled to a first end of the DCF, and a second amplifier having an input coupled to a second end of the DCF. One of the main purposes of the first amplifier is to control the power launched into the DCF for optimum SPM compensation, while the purpose of the second amplifier is to offset the insertion loss introduced into the optical path by the DCF fiber while launching the high power into the succeeding standard mode fiber.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

In the drawings, wherein like reference characters denote similar elements throughout the several views:

FIG. 1 is a block diagram depicting a system employing a compensating unit constructed in accordance with the present invention;

FIG. 5 is a block diagram depicting a communication system in which several compensating units are employed along an extended optical path, thereby serving as optical repeaters.

DETAILED DESCRIPTION OF THE PRESENTLY PREFERRED EMBODIMENTS

Figure 2A:
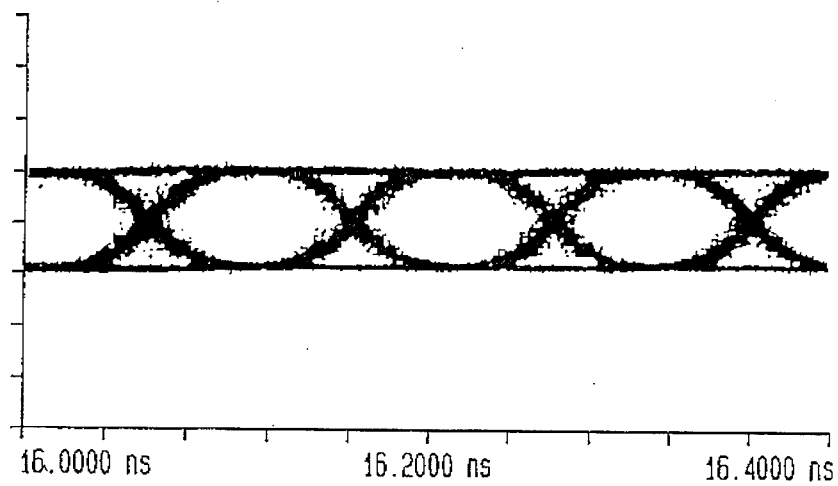
FIGS. 2A–2H are a series of eye diagrams for use in comparing the varying levels of compensation achieved by the compensating unit of FIG. 1.

As indicated above, it has heretofore been proposed to utilize lengths of DCF fiber to compensate for chromatic dispersion in a standard single mode fiber of a directly modulated system. The present embodiment simultaneously compensates both chromatic dispersion and self phase modulation simultaneously.

As will be readily appreciated by those skilled in the art, self-phase modulation (SPM) is introduced or experienced when a 1550 nm signal of high power is launched into a standard fiber 16 (FIG. 1). Because the standard fiber exhibits an anomalous dispersion region for a 1550 nm signal, the SPM effect appears as a pulse compression and associated pulse distortion. On the other hand, the SPM effect in the DCF fiber appears as a pulse broadening because the DCF fiber experiences the 1550 nm wavelength signal in the normal dispersion region. Moreover, the DCF fiber, which has a smaller mode field diameter than standard single mode fiber, experiences the SPM effect at a significantly lower power than the standard fiber. The present invention recognizes that by reducing/controlling the power level of the optical signal launched into the DCF fiber, it is possible to compensate not only for the dispersion effect of standard fiber, but also for pulse compression caused by SPM in the standard fiber.

Thus, and with initial reference to FIG. 1, there is shown a portion of an externally modulated optical fiber transmission system 10 constructed in accordance with the present invention. A transmitter 12 which may, for example, comprise a suitable laser and a LiNbO$_3$ modulator, produces a pulsed 1550 nm wavelength signal. The pulses are launched by an optical device, such as an erbium-doped fiber amplifier (EDFA) 14, into a standard single mode fiber 16. As should be apparent to those skilled in the art, amplifier 14 eliminates the loss limit transmission and provides the high power required for launching into the optical path defined by standard single mode fiber 16.

The pulses carried by single mode fiber 16 are received by a compensating unit 18 which, in the embodiment depicted in FIG. 1, includes a first optical amplifier 20, a means for adjusting the optical power of the signal output by amplifier 20 (an optical attenuator 22 in the illustrated embodiment), a section of dispersion compensating fiber 24, and a second optical amplifier 26. Depending upon the length of the optical path, the output of the second amplifier 26 of compensating unit 18 may be supplied directly to a receiver unit (not shown) or, in a manner hereinafter explained, may be supplied via one or more additional standard fibers to corresponding intermediate compensating units, each such compensating unit functioning as an optical repeater in an extended optical path.

Figure 2B:
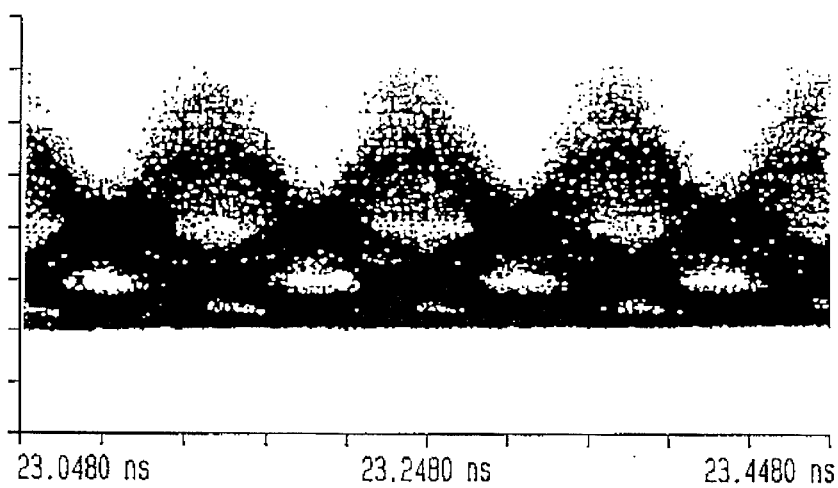

The compensating unit 18 of FIG. 1 consists of three principal parts—i.e. amplifier 20, whose action is to restore the power of the externally modulated signal launched into standard fiber 16 by transmitter 12, the DCF fiber 24, and means 22 for controlling the power level of the optical signal delivered to the DCF fiber. FIG. 2A shows an eye diagram representing the output of the transmitter 12, taken at point II-A of FIG. 1, for a test system having a LiNbO$_3$ modulator-based transmitter modulated with PSRW data at 10 Gb/s. FIG. 2B is an eye diagram, taken at point II-B of FIG. 1, of the same NRZ signal after traveling through 113 km of standard fiber. The power launched into the 113 km standard fiber was +12 dBm. As seen in FIG. 2B, the SPM effect on the standard fiber is characterized by a pulse compression and results in a poor eye configuration.

Figure 2C:
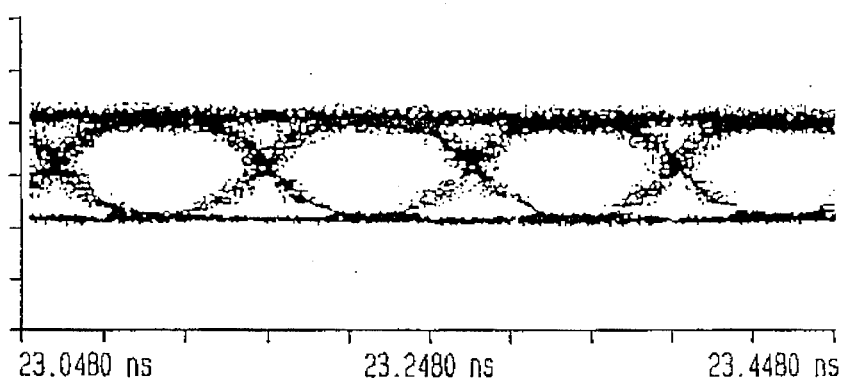

FIG. 2C is an eye diagram, taken at point II-C in FIG. 1, which depicts the same optical signal represented in the diagram of FIG. 2B after it has passed through compensating unit 18. The power launched into the DCF by amplifier 20 was +3 dBm. As seen in FIG. 2C, compensating unit 18 provided both dispersion compensation and compensation of the SPM pulse compression induced in the standard fiber. The close resemblance of FIG. 2C to FIG. 2A confirms that the launch of the +3 dBm signal into the DCF fiber 24 fully compensates and corrects the SPM effect induced in the standard fiber.

Figure 2D:
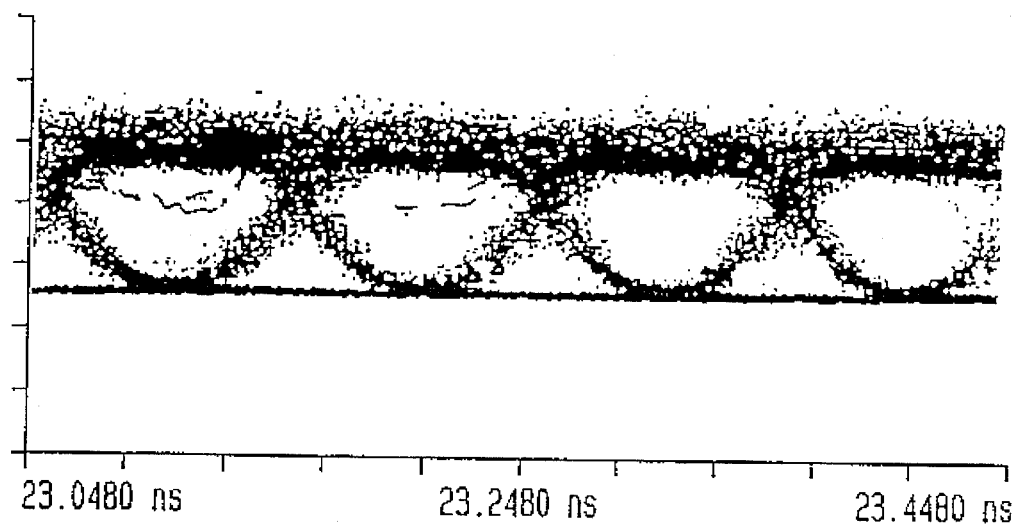
Figure 2E:
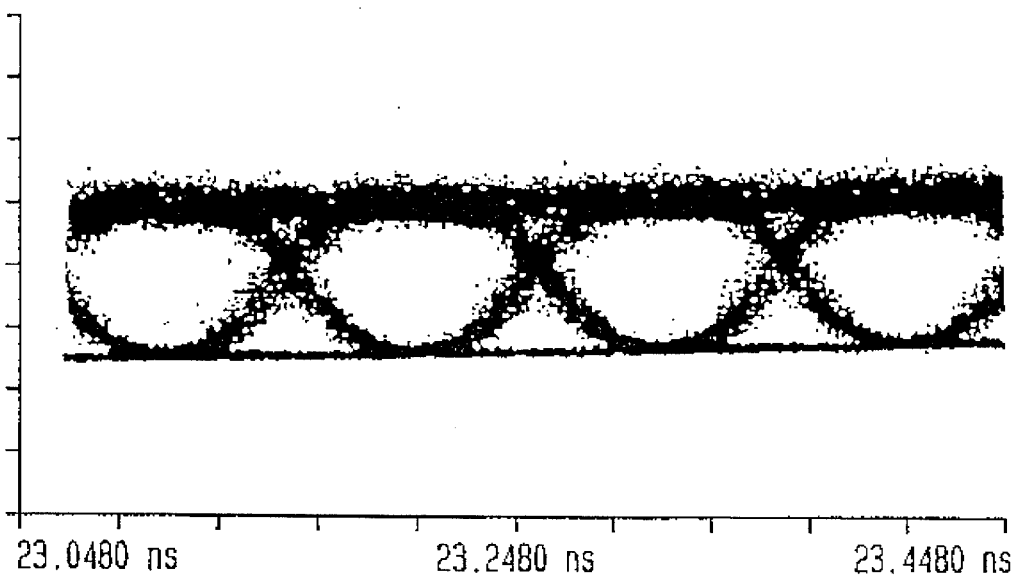

FIG. 2D is an eye diagram taken at the same location II-C in FIG. 1 as FIG. 2C, the FIG. 2D differing only in that the power launched into the DCF fiber was increased to +11 dBm. The eye configuration in FIG. 2D demonstrates dispersion compensation as well as a slight over-compensation of the SPM pulse compression induced in the standard fiber. FIG. 2E is similar to FIG. 2D with the launching power reduced to +8 dBm; comparing FIGS. 2D and 2E, a decrease in SPM over-compensation is clearly discernible.

Figure 2F:
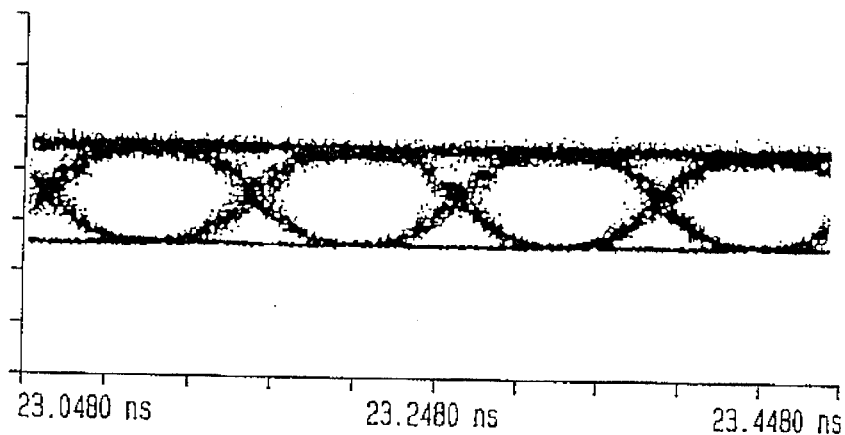
Figure 2G:
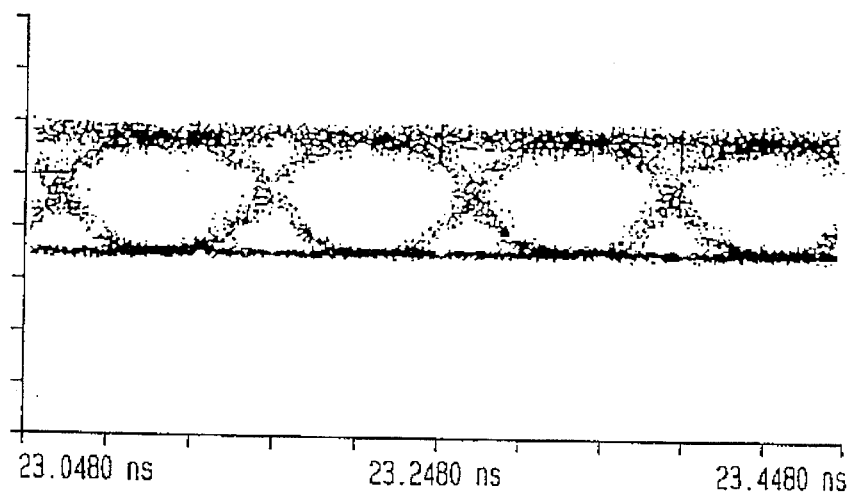
Figure 2H:
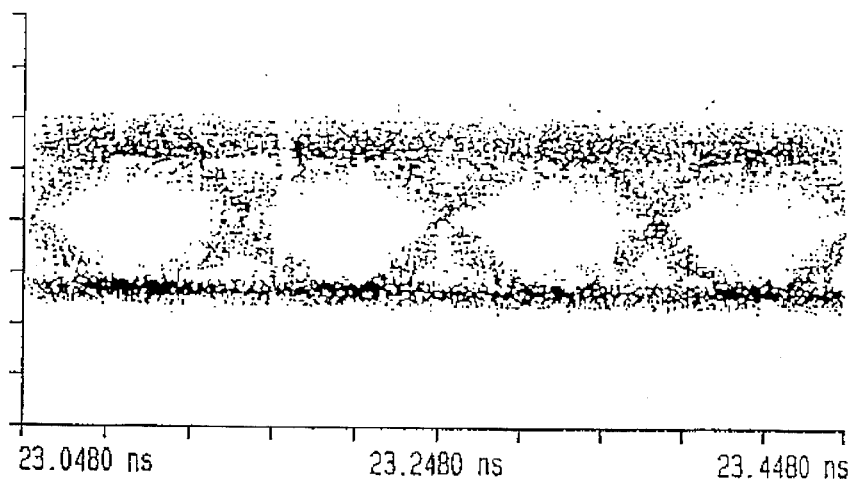

FIG. 2F is an eye diagram taken at the same location II-C as FIGS. 2C–2E with a power of −2 dBm launched into the DCF fiber. As in the case depicted in FIG. 2C, the eye diagram of FIG. 2F is almost identical to that of FIG. 2A. It is thus apparent that the effects of chromatic dispersion and SPM in the standard fiber are also completely compensated for at this relatively reduced power level. FIGS. 2G and 2H are eye diagrams taken at further reduced power levels of −7 dBm and −11 dBm, respectively, at the input of the DCF fiber.

It will be recalled that in the embodiment of FIG. 1, the means for adjusting the optical power of the signal output by amplifier 20 before it is launched into the DCF fiber 24 was configured as an optical attenuator 22. Although optical attenuators which are selectively operable to modify the power level of an input optical signal are well known and commercially available, it should be noted that other techniques and components may alternatively be utilized to control the launch power into the DCF fiber as appropriate for the purposes of the present invention.

Figure 3:
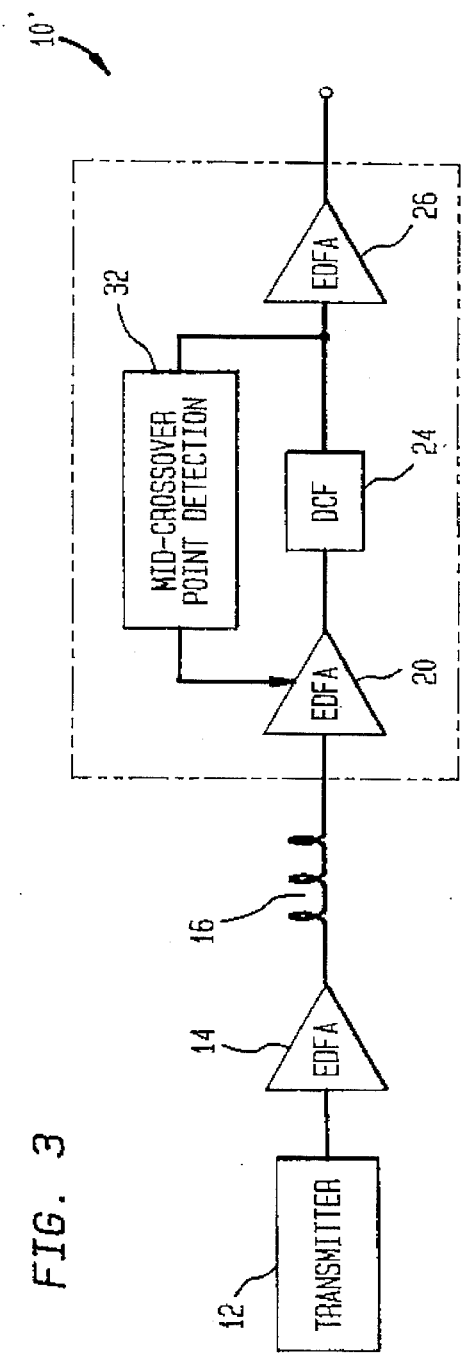
FIG. 3 is a block diagram depicting an alternate embodiment of a compensating unit constructed in accordance with the present invention.

Accordingly, an alternate embodiment of an optical fiber transmission system 10' constructed in accordance with the present invention is depicted in FIG. 3. As there shown, a modulated optical signal is carried by standard single mode optical fiber 16 and amplified by optical amplifier 20 as necessary to achieve the desired launch power into DCF fiber 24. In this second embodiment, the optical attenuator is omitted and the gain of optical amplifier 20 is controlled directly by a mid-crossover point detector 32. Feedback control schemes employing such a detecting device acquire and lock at the optimum optical eye diagram. The detector 32 utilized by the illustrative embodiment may operatively involve, for example, the application of a dither frequency and phase detection of the DCF fiber output to optimize the output power of the optical amplifier.

Figure 4:
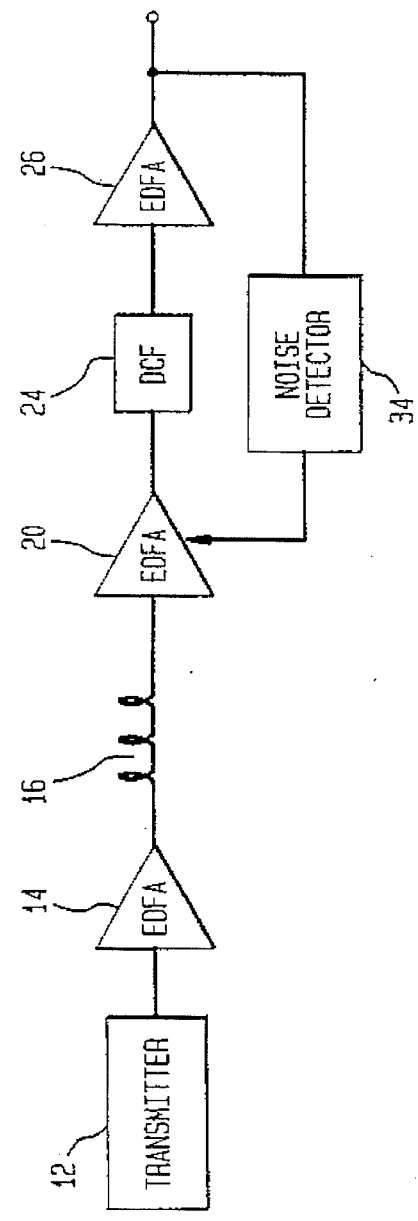
FIG. 4 is a block diagram depicting still another embodiment of a compensating unit constructed in accordance with the present invention.

A further alternate embodiment of an optical communications system constructed in accordance with the present invention is depicted in FIG. 4 and is designated generally at 10". In this third embodiment, the mid-crossover point detector 32 utilized in the embodiment of FIG. 3 is replaced by a noise detecting module 34 which may include, by way of example, an electrical low pass filter (not shown). As will be apparent to those skilled in the art, an appropriate splitter and photodiode (not shown) may be utilized to convert the optical signal output by the DCF fiber 24 to an electrical input for such a filter. As indicated in FIG. 2D, the noise level of the signal will increase in response to over-compensation—i.e. when too high a level of power is launched into the DCF fiber. Moreover, and as shown in FIG. 2H, degradation of the S/N ratio is readily discernible when the power level launched into the DCF fiber is too low. It will therefore be appreciated by those skilled in the art that the optimal dispersion and SPM compensation may also be achieved by adjusting the gain of amplifier 20 when noise in the DCF output exceeds a predetermined threshold.

An illustrative optical communications system having an extended optical path defined by a plurality of standard single mode fiber sections 16a, 16b and 16c is depicted in FIG. 5. As seen in FIG. 5, a 1550 nm wavelength optical signal is launched into standard fiber 16a by transmitter 12 and is received by a first repeating/compensating unit 18a. Additional compensating units are indicated generally at 18b and 18c. Each repeating/compensating unit 18a, 18b, 18c is configured essentially the same as compensating unit 18 of FIG. 1. The first amplifier (not shown) of compensating unit 18a thus serves to restore the power loss occurring as a result of transmission over the first fiber section 16a. The output of the first amplifier is adjusted in accordance with a suitable feedback control technique such, for example, as those described in connection with FIGS. 1, 3, and 4, and is launched into the DCF fiber for compensation of chromatic dispersion and self-phase modulation as hereinabove described. The second amplifier of unit 18a, as the amplifier 26 of FIG. 1, restores the output power of the DCF fiber to offset insertion losses introduced thereby and launches the signal compensated by unit 18a into fiber section 16b. The compensation procedure is repeated at the site of each standard fiber section junction or node by additional repeating/compensating units, such as the units 18b and 18c in FIG. 5; additional repeating/compensating units 18, and additional section of fiber 16, may be added to further extend the communications system. The signal output by unit 18c is received and processed by a conventional receiver device 36. A optical communications system constructed in accordance with the present invention is thus adapted to provide simultaneous compensation of the loss, dispersion, and SPM introduced in each section of standard, single mode fiber along the optical path.

The concepts embodied in the present invention may be utilized in both digital and analog signal transmission and in either standard fiber or dispersion shifted fiber. Moreover, in addition to optical repeating applications, a compensating unit constructed in accordance with the present invention may also be employed in other applications and arrangements in which dispersion and SPM compensation are desired, such as in power booster or optical pre-amplifier receiver applications.

Thus, while there have been shown and described and pointed out fundamental novel features of the invention as applied to several preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A system for compensating for optical dispersion and self-phase modulation of a single mode fiber optic cable carrying an externally modulated optical signal, comprising:

first optical amplifier means connectable to the fiber optic cable for receiving the optical signal from the cable and for amplifying the optical signal to a launching power;

compensating means for receiving the amplified optical signal from said first optical amplifier means and for compensating for optical dispersion in the optical signal accumulated along the fiber optic cable; and controlling means coupled to said first optical amplifier means for continuously controlling the launching power of the amplified optical signal to be launched into said compensating means by said first optical amplifier means so as to optimize compensation for self-phase modulation introduced into the optical signal by the fiber optic cable, said controlling means including monitoring means coupled to an output of said compensating means for monitoring noise in the optical signal caused by over-compensation and under-compensation of self-phase modulation and for adjusting the optical power of the amplified optical signal to be launched into said compensating means when noise exceeds a predetermined threshold.

2. The system of claim 1, wherein said fiber optic cable comprises a standard fiber optic cable.

3. The system of claim 2, wherein said compensating means comprises a dispersion compensating fiber having a length selected to compensate for chromatic dispersion introduced into the optical signal by the standard fiber optic cable.

4. The system of claim 1, wherein said controlling means comprises an adjustable optical attenuator optically coupled to said first optical amplifier means.

5. The system of claim 1, wherein said controlling means comprises a means for selectively controlling an optical gain of said first amplifier means.

6. The system of claim 1, further comprising second amplifier means, having an input coupled to an output of said compensating means, for compensating for insertion losses introduced into the optical signal by said compensating means.

7. An externally modulated optical fiber communication system, comprising:

an externally modulated transmitting means for generating an optical signal;

a single mode fiber optic cable coupled to said transmitting means for receiving the optical signal therefrom;

at least one optical repeater means coupled to the fiber optic cable for restoring power to the optical signal, said optical repeater means including:

a first optical amplifier means connectable to the fiber optic cable for receiving the optical signal from the cable and for amplifying the optical signal to a launching power, compensating means for receiving the amplified optical signal from the first amplifier means and for compensating for optical dispersion in the optical signal accumulated along said fiber optic cable, and controlling means coupled to the first optical amplifier means for continuously controlling the launching power of the amplified optical signal to be launched into said compensating means by the first optical amplifier means so as to optimize compensation for self-phase modulation introduced into the optical signal by the fiber optic cable, said controlling means including monitoring means coupled to an output of said compensating means for monitoring noise in the optical signal caused by over-compensation and under-compensation of self-phase modulation and for adjusting the optical power of the amplified optical signal to be launched into said compensating means when noise exceeds a predetermined threshold; and receiving means coupled to said compensating means for receiving a compensated optical signal therefrom.

8. The system of claim 7, wherein each of said at least one optical repeater means is coupled to another of said optical repeater means by a single mode fiber optic cable.

9. The system of claim 8, wherein each of said single mode fiber optic cables comprises a 1300 nm zero dispersion fiber.

10. The system of claim 7, wherein said compensating means includes a dispersion compensating fiber.

11. The system of claim 10, wherein said at least one optical repeater means further includes a second optical amplifier means operable to compensate for insertion losses introduced by the dispersion compensating fiber.

12. The system of claim 7, wherein said controlling means comprises an adjustable optical attenuator optically coupled to said first optical amplifier means.

13. The system of claim 7, wherein said controlling means comprises a means for selectively controlling an optical gain of said first amplifier means.

14. A method for compensating for optical dispersion and self-phase modulation introduced into an optical signal by a fiber optic cable, comprising the steps of:

supplying an externally modulated optical signal to an optical amplifier via the fiber optic cable;

launching said optical signal from the optical amplifier into a length of dispersion compensating fiber selected to compensate for chromatic dispersion;

continuously controlling during said supplying step optical power of the optical signal launched during said launching step so as to optimize compensation for self-phase modulation induced in the optical signal by the fiber optic cable; and continuously measuring noise in an optical signal output by the dispersion compensating fiber caused by over-compensation and under-compensation of self-phase modulation and adjusting the optical power of the amplified optical signal to be launched into the dispersion compensating fiber from the optical amplifier to maintain noise within predetermined limits.

15. The method of claim 14, wherein said controlling step includes adjusting the power of the optical signal launched during said launching step by adjusting a gain of said optical amplifier.

16. The method of claim 14, wherein said optical signal has a wavelength selected to cause anomalous dispersion in said fiber optic cable.

17. The method of claim 16, wherein said fiber optic cable is a standard, single mode fiber and said selected wavelength is approximately 1550 nm.

18. The method of claim 16, wherein said fiber optic cable is a dispersion shifted cable.

19. The method of claim 14, wherein said controlling step includes adjusting the power of the optical signal launched during said launching step by adjusting attenuation of an adjustable attenuator interposed between said optical amplifier and the dispersion compensating fiber.

* * * * *